United States Patent [19]

Lindell et al.

[11] 3,860,868

[45] Jan. 14, 1975

[54] VOLTAGE POLARITY SENSOR INDICATOR AND DIRECTOR CIRCUIT DEVICE

[76] Inventors: Joseph S. Lindell; Richard G. Noullett, both of 104 Summit St., Butler, Pa. 16001

[22] Filed: Sept. 26, 1973

[21] Appl. No.: 400,932

[52] U.S. Cl. .................... 324/133, 307/236, 321/47, 324/119

[51] Int. Cl. .................... G01r 19/14

[58] Field of Search .................... 324/131–133, 324/119; 321/47, 43; 307/236; 328/118

[56] References Cited

UNITED STATES PATENTS

| | | | |
|---|---|---|---|
| 3,262,047 | 7/1966 | Hochberg | 321/43 |
| 3,358,189 | 12/1967 | Philippidis | 321/47 X |
| 3,437,928 | 4/1969 | Baker et al. | 324/133 |
| 3,452,347 | 6/1969 | Stimson | 324/133 X |
| 3,581,186 | 5/1971 | Weinberger | 321/47 X |
| 3,582,758 | 6/1971 | Gunn | 321/47 |

*Primary Examiner*—Gerard R. Strecker
*Attorney, Agent, or Firm*—Buell, Blenko and Ziesenheim

[57] ABSTRACT

A voltage polarity sensor indicator and director circuit device which has a pair of output terminals and a pair of input terminals. The device has a pair of light-emitting infrared diodes each with a corresponding photosensitive transistor. The light-emitting diodes and photosensitive transition are coupled so that regardless of the input polarity, the output polarity will always be identical across the output terminals. Depending upon the input polarity, one of the pair of diodes and corresponding transistors will conduct. If the polarity is switched on the input, the other diode and the corresponding transistor will conduct, thereby directing the output polarity always to remain a constant regardless of the input.

5 Claims, 3 Drawing Figures

VOLTAGE POLARITY SENSOR INDICATOR AND DIRECTOR CIRCUIT DEVICE

This invention relates to a voltage polarity sensor indicator and director circuit device.

The art known and used to maintain the polarity at constant is a bridge rectifier circuit. The problem with this circuit, however, is that it is expensive in view of the rectifiers and the assemblage problem involved. Furthermore, to add indicator devices with the old bridge circuit would be expensive because of the assemblage. The present invention overcomes this by providing a polarity sensitive sensor indicating the polarity which has a pair of input terminals. The circuit then directs polarity on the input to an output which is constant regardless of the polarity on the input.

I provide a voltage polarity sensor indicator and director circuit device which comprises a pair of input terminals A and B; a pair of output terminals C and D; a first light-emitting infrared diode having an anode and cathode and a corresponding first photosensitive transistor with a collector and emitter, means coupling the anode input terminal A, means coupling the cathode to output terminal C, means coupling the emitter to input terminal B and means coupling the collector to output terminal D; and a second light-emitting infrared diode having an anode and cathode and a corresponding second photosensitive transistor with a collector and emitter, means coupling the anode to input terminal B, means coupling the cathode to output terminal C, means coupling the emitter to input terminal A and means coupling the collector to output terminal D.

In the accompanying drawings I have shown a presently preferred method and embodiment of the invention in which.

Figure 1:
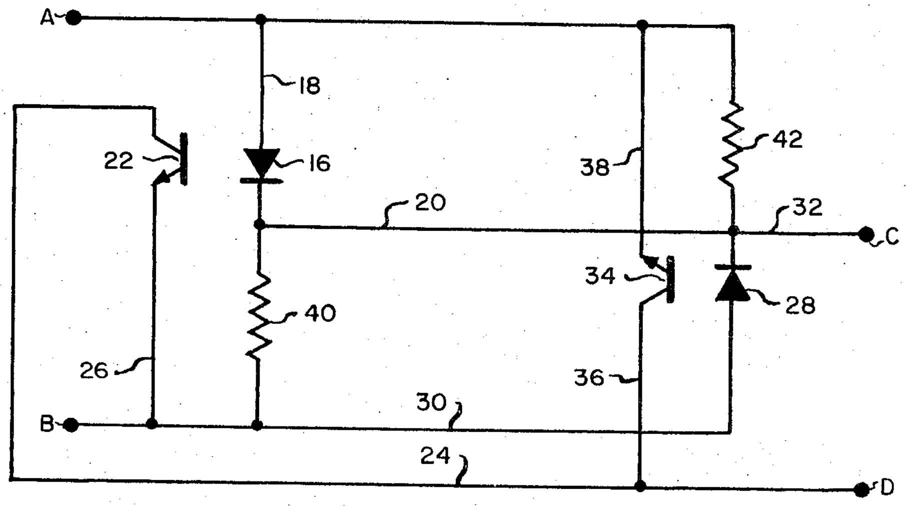
FIG. 1 is a schematic of one embodiment of the invention.

Referring to FIG. 1, the circuit comprises a pair of input terminals referred to as A and B and a pair of output terminals C and D. A first light-emitting diode (LED) 16 has an anode and a cathode with the anode connected to the input terminal A by a lead 18 and the cathode is coupled by lead 20 to output terminal C. The first light-emitting diode 16 has a corresponding photosensitive transistor 22 which conducts when light is received from the light-emitting diode 16 which radiates light when it is conducting current. The collector of the transistor 22 is coupled to output terminal D and the emitter is coupled to the input terminal B by means of leads 24 and 26, respectively. A second light-emitting diode 28 is coupled at the anode to terminal B through lead 30 and the cathode is coupled through lead 32 to output terminal C. Corresponding to the second light-emitting diode 28 is a photosensitive transistor 34 which conducts when light is received from the light-emitting diode 28 which radiates light when it is conducting. The collector of the transistor 34 is coupled through lead 36 to output terminal D. The emitter of the photosensitive transistor 34 is coupled to input terminal A through lead 38. Resistors 40 and 42 are chosen to limit the current through the diodes 16 and 28.

Figure 2:
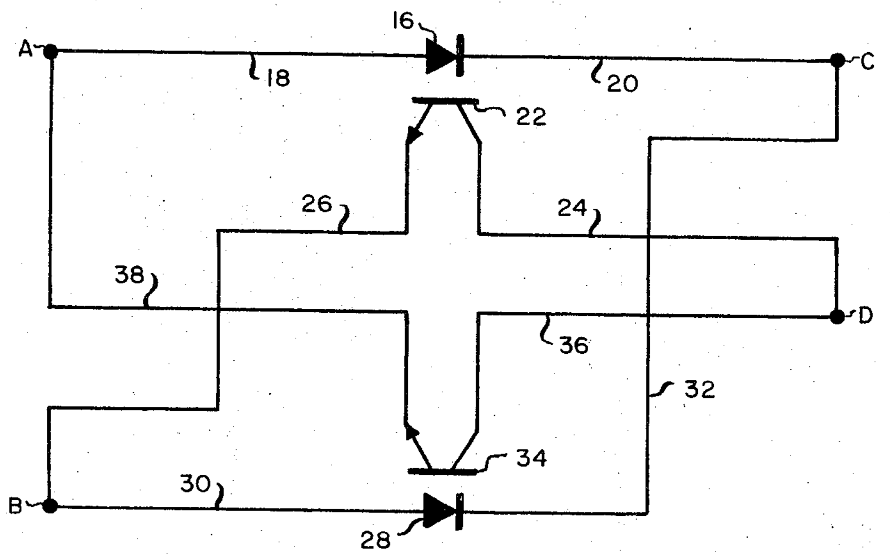
FIG. 2 is a schematic of a second embodiment of the invention.
Figure 3:
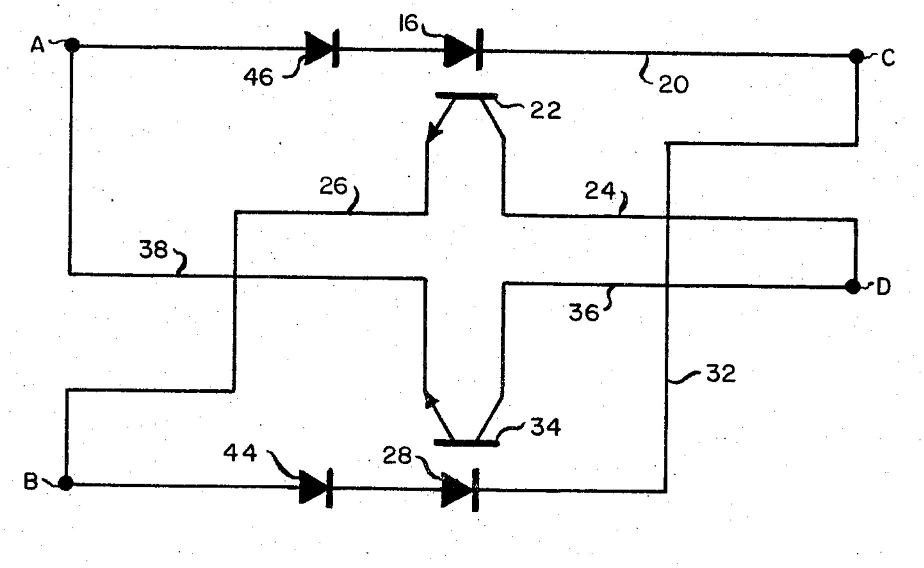
FIG. 3 is a third embodiment of the invention.

FIG. 2 essentially shows the same circuit as FIG. 1 except for the absence of the resistors 40 and 42. FIG. 3 is identical to FIG. 2 with the exception of the inclusion of silicon diodes 44 and 46. The reason for diodes 44 and 46 is to create a safety factor or peak reverse current to protect light-emitting diodes 16 and 28. The light-emitting diodes 16 and 28 with their corresponding photosensitive transistors 22 and 34 respectively are off-the-shelf items and are found in Allied Catalog 1973, pages 14 and 15. When the diode conducts, it emits a light which could be infrared and which is received by photosensitive material in the corresponding photosensitive transistors 22 and 34 which causes it to conduct.

It is to be distinctly understood that other types of photosensitive semiconductors can be used as well as other light-emitting semiconductors.

In operation (referring to FIG. 1), assume a positive polarity at input terminal A with respect to a negative polarity at input terminal B. The positive signal will conduct through light-emitting diode 16 through lead 20 to output terminal C through any load which may be coupled between C and D. The light-emitting diode 16 will emit light which is picked up by photosensitive transistor 22 causing it to conduct a current from the load at output terminal D to the collector through the emitter and back to the negative terminal B completing the circuit. If for any reason the polarity between A and B should be reversed, then assuming terminal B is positive with respect to A, light-emitting diode 28 will conduct and light-emitting diode 16 will not conduct. While light-emitting diode 28 conducts, terminal C will be positive with respect to terminal D. The photosensitive transistor 34 will also conduct from D through the collector through the emitter back to input terminal A which is negative with respect to B and thereby complete the circuit. By use of such a device the output at C is always positive with respect to D regardless of the polarity between A and B. Also, the diode which can provide a visual signal will tell any operator trying to meter a circuit which of the two terminals A and B are positive with respect to one another. The operation for this device is identical with respect to the circuits in FIGS. 2 and 3.

The advantages of such a circuit are far reaching and in particular they are highly useful as a very simplified component which can be placed in a probe to be used with metering circuits and DC circuits or they can be built into metering devices such as a DC voltmeter which is used to give a direct read-out. The hook-up of the DC voltmeter is virtually insured as being correct regardless of the input polarity. One need not concern themselves about which lead is coupled to the input because it will alway give a positive reading since the terminals C and D can be built directly into the meter to the needle circuit. Such equipment is easily manufactured because of its simplistic design and yet it is highly efficient giving an economical circuit which is much less expensive to manufacture and gives more versatility than the old-fashioned bridge circuit.

I claim:

1. A voltage polarity sensor indicator and director circuit device which comprises:

a. a pair of input terminals A and B;

b. a pair of output terminals C and D;

c. a first light-emitting infrared diode having an anode and cathode and a corresponding first photosensitive transistor with a collector and emitter, means coupling the anode to input terminal A, means coupling the cathode to output terminal C, means coupling the emitter to input terminal B and means coupling the collector to output terminal D; and d. a second light-emitting infrared diode having an anode and cathode and a corresponding second photosensitive transistor with a collector and emitter, means coupling the anode to input terminal B, means coupling the cathode to output terminal C, means coupling the emitter to input terminal A and means coupling the collector to output terminal D.

2. A voltage polarity sensor indicator and director circuit device as recited in claim 1 wherein a first limiting impedance is coupled between the anode of the first diode and input terminal B, and a second limiting resistor is coupled between the anode of the second diode and input terminal A.

3. A voltage polarity sensor indicator and director circuit device as recited in claim 1 wherein a first limiting diode is coupled between the anode of the first diode and input terminal A and a second diode is coupled between the anode of the second diode and input terminal B.

4. A voltage polarity sensor indicator and director circuit device which comprises:

a. a pair of input terminals A and B;

b. a pair of output terminals C and D;

c. a first means which conducts a signal in one direction only as positive to negative, a means couples the input terminal A to the positive and the negative to the output terminal C;

d. a first responsive means which is responsive to the conduction of the first means and conducts when the first means conducts, means coupling the first responsive means between input terminal B and output terminal D;

e. a second means which conducts a signal in one direction only as positive to negative, a means couples the positive to input terminal B and the negative to output terminal C; and f. a second responsive means which is responsive to the conduction of the first means and conducts when the second means conducts, a means coupling the second responsive means between input terminal A and output terminal D.

5. A voltage polarity sensor indicator and director circuit device as recited in claim 4 wherein the first and second means have a means to emit light when they conduct.

* * * * *